Figure 1:
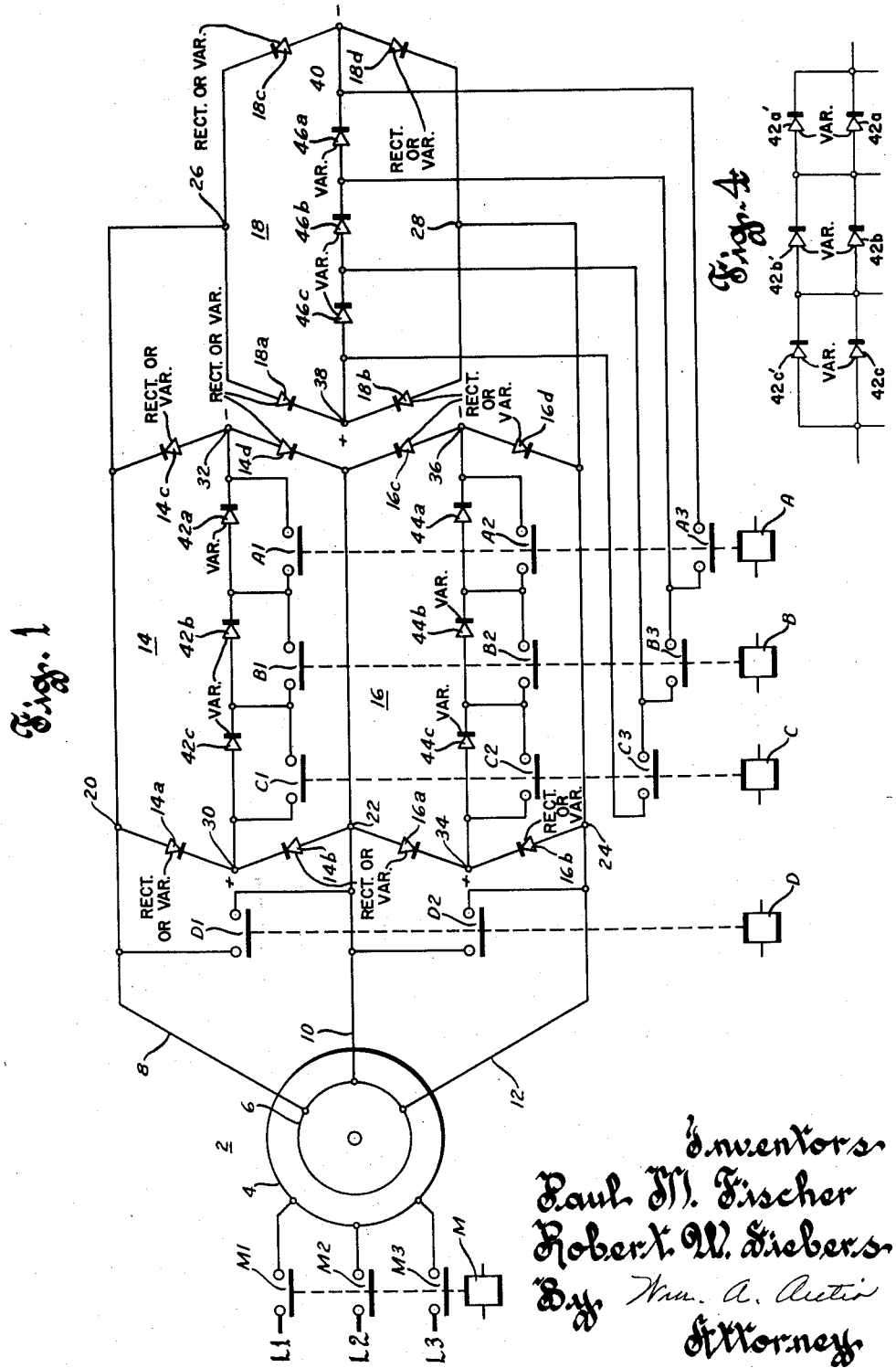

United States Patent Office 3,082,364
Patented Mar. 19, 1963

3,082,364
ALTERNATING CURRENT MOTOR CONTROL
AND SPEED REGULATING SYSTEMS
Paul M. Fischer, Elm Grove, and Robert W. Siebers, Milwaukee, Wis., assignors to Cutler-Hammer, Inc., Milwaukee, Wis., a corporation of Delaware
Filed July 25, 1960, Ser. No. 44,967
12 Claims. (Cl. 318—239)

This invention relates to alternating current motor control and speed regulating systems. More particularly, the invention relates to systems for selectively adjusting the speed of induction motors of the wound rotor slip-ring type and for automatically regulating the speeds thereof under varying load.

Paul M. Fischer copending application Serial No. 45,213, filed July 25, 1960, now Patent No. 3,017,544, dated January 16, 1962, relates to systems for controlling and regulating the speed of induction motors of the slip-ring type which employ varistors in the secondary network. The varistors are selectively connected to the secondary winding or shunted therefrom to control the speed of the motor. At any selected speed point, the varistors in the circuit respond to changes in secondary voltage when the motor speed changes varying load to adjust the motor torque thereby to maintain the motor speed substantially constant. This invention relates to improvements on systems of the aforementioned type.

An object of the invention is to provide improved alternating current motor control and speed regulating systems.

A more specific object of the invention is to provide improved secondary varistor networks for induction motors of the slip-ring type.

Another specific object of the invention is to provide such networks with improved means for regulating the motor speed under varying load.

A further specific object of the invention is to provide improved unidirectional varistor networks for regulating the speeds of plural-phase induction motors of the slip-ring type under varying load whereby full 360 degree conduction is obtained in each phase of the secondary network.

Another object of the invention is to provide improved means for affording 360 degree sine wave conduction in the primary windings of a plural-phase induction motor and in the power supply lines.

Another object of the invention is to provide such networks which are simple and economical in construction and afford superior speed regulating performance.

According to the invention, there are provided secondary varistor networks for plural-phase induction motors of the slip-ring type. Each phase of the secondary winding is provided with a full-wave rectifier bridge and these rectifier bridges are connected in delta or star relation. A plurality of varistors are connected in series across the output terminals of each rectifier bridge so that the full 360 degree conduction is obtained through the varistors in each bridge. And a plurality of selectively operable speed control contactors are arranged to shunt varistors or subgroups thereof from the plurality of rectifier bridges.

Figure 2:
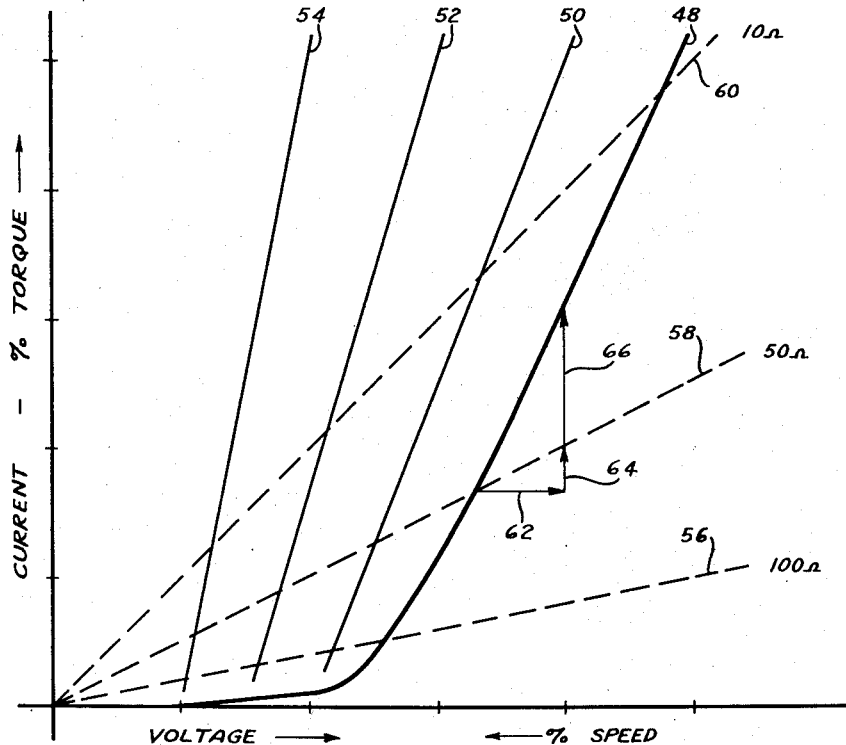
Figure 3:
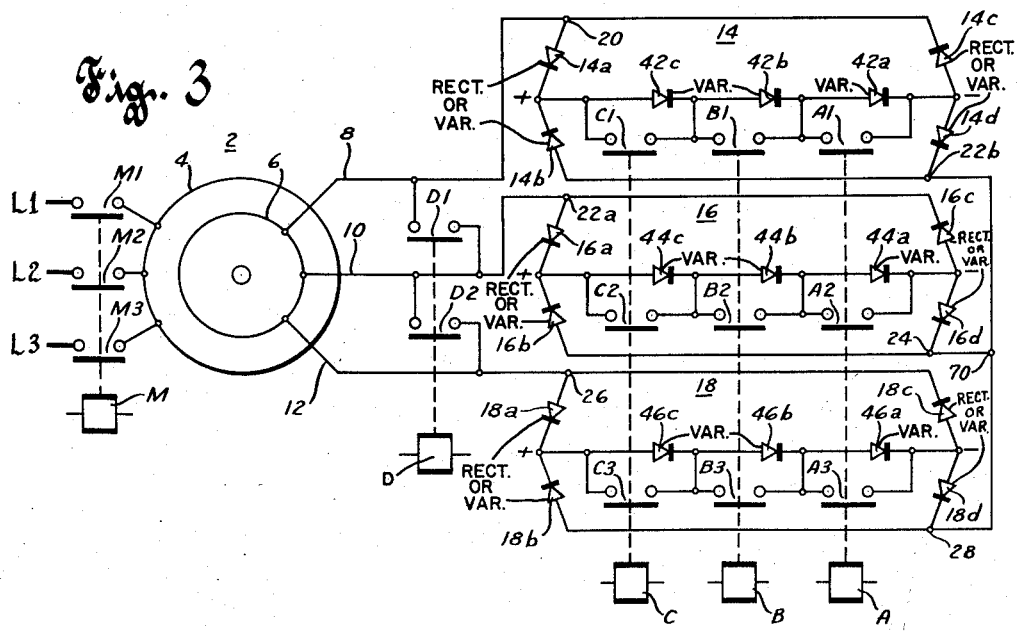

The above mentioned and other objects and advantages of the invention and the manner of obtaining will become more apparent and the invention itself will be best understood by reference to the following description of embodiments thereof taken in conjunction with the accompanying drawings, wherein:

FIGURE 1 diagrammatically shows a motor and secondary varistor control system constructed in accordance with the invention;

FIG. 2 is a graphical illustration of the non-linear resistance characteristics of the varistor network of the invention in comparison with the characteristics of conventional linear secondary resistors;

FIG. 3 diagrammatically shows a motor and modified secondary varistor control system; and FIG. 4 is a fragmentary schematic diagram which illustrates a modification of the invention shown in FIGS. 1 and 3.

As is explained later, certain elements of the rectifying bridges are preferably rectifying diodes but unidirectional varistors may be substituted therefor. For this reason, these rectifying bridge elements in FIGS. 1 and 2 are identified with the label "Rect. or Var." in order to distinguish these elements from other circuit components shown in FIGS. 1, 3 and 4 which are described only as varistors and are therefore labeled "Var."

Referring to FIG. 1, there is shown an alternating current induction motor 2 of the wound rotor slip-ring type having its three-phase primary or stator winding 4 connectable through normally open contacts M1, M2 and M3 of a main power contactor M and power supply lines L1, L2 and L3 to a three-phase power supply source. The operating coil of contactor M may be energized from one phase of the source in a suitable manner to close the contacts and to energize the motor. The three-phase secondary or rotor winding 6 is connected through conductors 8, 10 and 12 to the input terminals of a unidirectional varistor network comprising three single-phase full-wave rectifier bridges 14, 16 and 18 connected in delta arrangement, there being a series of varistor elements connected across the output terminals of each such rectifier bridge as hereinafter described.

Conductor 8 is connected to the first input terminal 20 of rectifier bridge 14 and conductor 10 is connected to the second input terminal 22 of rectifier bridge 14, terminal 22 being a common point also constituting the first input terminal of rectifier bridge 16. Conductor 12 is connected to the second input terminal 24 of rectifier bridge 16. Conductors 8 and 12 are also connected to input terminals 26 and 28, respectively, of rectifier bridge 18.

Each rectifier bridge is provided with four unidirectional current conducting diodes in the usual arrangement. Thus, diodes 14a and 14b of rectifier bridge 14 are connected from respective input terminals 20 and 22 thereof to positive output terminal 30 and are poled to conduct in their forward direction toward terminal 30. Diodes 14c and 14d of rectifier bridge 14 are connected from negative output terminal 32 to respective input terminals 20 and 22 thereof and are poled to conduct in their forward direction away from terminal 32. Similarly, diodes 16a and 16b of rectifier bridge 16 are connected from respective input terminals 22 and 24 thereof to positive output terminal 34 and are poled to conduct in their forward direction toward terminal 34. Diodes 16c and 16d of rectifier bridge 16 are connected from negative output terminal 36 to respective input terminals 22 and 24 thereof and are poled to conduct in their forward direction away from terminal 36. In a similar manner, diodes 18a and 18b of rectifier bridge 18 are connected from respective input terminals 26 and 28 thereof to positive output terminal 38 and are poled to conduct in their forward direction toward terminal 38. Diodes 18c and 18d of rectifier bridge 18 are connected from negative output terminal 40 to respective input terminals 26 and 28 thereof and are poled to conduct in their forward direction away from terminal 40.

A group comprising a plurality of series-connected varistor elements 42a, 42b and 42c is connected between the positive and negative output terminals 30 and 32 of rectifier bridge 14, the varistor elements being poled to conduct in their forward direction from the positive to the negative terminal. A second group comprising a plurality of series-connected varistor elements 44a, 44b and 44c is connected between the positive and negative output terminals 34 and 36 of rectifier bridge 16, the varistor elements being poled to conduct in their forward direction from the positive to the negative terminal. A third group comprising a plurality of series-connected varistor elements 46a, 46b and 46c is connected between the positive and negative output terminals 38 and 40 of rectifier bridge 18, the varistor elements being poled to conduct in their forward direction from the positive to the negative terminal.

A plurality of speed control contactors, A, B, C and D are provided for controlling the secondary varistor network. Contactors A, B, C and D may be energized from one phase of the source in succession. Contactors A, B and C are each operable to shunt a varistor element from the three rectifier bridges whereas contactor D is operable to shunt the three rectifier bridges and to short circuit the motor secondary winding. For this purpose, contactor A is provided with normally open contacts A1, A2 and A3 connected across varistor elements 42a, 44a and 46a, respectively. Contactor B is provided with normally open contacts B1, B2 and B3 connected across varistor elements 42b, 44b and 46b, respectively. Contactor C is provided with normally open contacts C1, C2 and C3 connected across varistor elements 42c, 44c and 46c, respectively. And contactor D is provided with normally open contacts D1 and D2 connected between conductors 8 and 10 and conductors 10 and 12, respectively.

While each contact of contactors A, B and C has been shown as being operable to shunt a single varistor element, the invention contemplates each such illustrated varistor element as being representative of a subgroup of series-connected or parallel-connected varistor elements or combinations thereof as well. FIG. 4 illustrates such a circuit modification in which varistor 42c′ is connected in parallel with varistor 42c, varistor 42b′ is connected in parallel with varistor 42b, and varistor 42a′ is connected in parallel with varistor 42a so that each of contacts C1, B1 and A1 (FIGS. 1 and 3) serve to shunt out two parallel connected varistors. The other groups 44a–c and 46a–c of varistors would be similary modified. It is further contemplated that more than two varistors may be similarly connected in parallel across each contact and that each of these varistor elements in turn may be representative of a subgroup of series-connected or parallel-connected varistor elements or a combination thereof. It may be seen that the number of such combinations is almost without limit and it is not intended that the invention be limited to any particular arrangement of varistors within each such group of varistors.

Referring to FIG. 2 wherein secondary current and percent motor torque values are plotted against secondary voltage and percent speed values, respectively, solid line curves 48, 50, 52 and 54 illustrate non-linear resistance characteristics of decreasing numbers of varistors in the three-phases of the motor secondary circuit. For example, curve 48 shows the resistance characteristics of all the varistors or groups thereof in the circuit, curve 50 represents the resistance characteristics after one varistor element or subgroup thereof in each phase has been shunted, etc. It will be apparent from FIG. 2 that at low voltage the resistance of the varistors is high so that only a small value of current flows therethrough. As the voltage increases above a predetermined value, the resistance abruptly begins to decrease and decreases at a faster rate with further increase in voltage as shown by the upper portion of curve 48 and curves 50, 52 and 54.

In FIG. 2, broken line curves 56, 58 and 60 illustrate linear resistance characteristics for several different values of conventional secondary resistors, for example 100, 50 and 10 ohms, employed in motor secondary networks. Referring to curve 58, for example, it will be apparent that for a given decrease in speed 62, the secondary current increases a relatively small amount 64. As a result, with conventional linear secondary resistors motor speed regulation is inadequate and the motor will not maintain a constant speed under varying load. On the other hand, use of varistors according to the invention affords significantly better speed regulation under varying load. Referring to curve 48, for example, such given decrease in speed 62 due to increase in motor load causes the secondary current and consequently the motor torque to increase a substantially larger amount 66. As a result, any change in speed causes an immediate change in motor torque to bring the speed toward the selected value. In other words, with the use of varistors in the secondary circuit, a change in speed will be reflected sooner in a compensating change in torque and the system will respond to smaller changes in speed to maintain motor rotation under varying load. Where a conventional system might stall under load increase, the non-linear system according to the invention develops the required torque with only a slight decrease in speed.

It will be apparent from FIG. 2 that at slow motor speeds with more resistance in the secondary circuit, conventional resistors afford still poorer speed regulation as shown by the slope of curve 56. On the other hand, varistors according to the invention afford characteristic curves having much steeper slopes at low speeds. Moreover, the slopes of the varistor curves are steeper at all operating values of resistance than are the slopes of the conventional linear resistor curves.

Varistor devices 42a–c, 44a–c and 46a–c are preferably solid element selenium unidirectional diodes poled to conduct in the forward direction. A desirable characteristic which these diodes should have for speed regulation purposes according to the invention is directly opposite to the characteristics required for rectification purposes. For example, the lower the initial forward resistance, the better the element is for rectification purposes. However, a high initial forward resistance with a sharp breakover is desirable for slip-ring motor speed regulation. Consequently, these elements can be manufactured at less cost without the accurate controls required to obtain good rectification.

When the operating coil of main power contactor M is energized in FIG. 1, contacts M1, M2 and M3 close to connect power to the motor primary winding to start the motor. Current flows from the secondary winding through conductor 8, diode 14a, varistors 42c, 42b and 42a, diode 14d and conductor 10 to the secondary winding during the 180 electrical degree period when the potential of conductor 8 is positive relative to the potential of conductor 10. Current also flows from conductor 8 through diode 18a, varistors 46c, 46b and 46a and diode 18d to conductor 12. Similarly, current flows from conductor 10 through diode 16a, varistors 44c, 44b and 46a and diode 16d to conductor 12 and from conductor 10 through diode 14b, varistors 42c, 42b and 42a and diode 14c to conductor 8. Also, current flows from conductor 12 through diode 18b, varistors 46c, 46b and 46a and diode 18c to conductor 8 and from conductor 12 through diode 16b, varistors 44c, 44b and 44a and diode 16c to conductor 10. Current flows in each of the aforementioned circuits for a full 180 electrical degree period, these periods being in repetitive, overlapping sequential relation according to the three-phase secondary voltage and the connection of the rectifier bridges to the secondary winding. It will, therefore, be apparent that full half-cycles of the rectified secondary voltage and applied to each of the series-connected groups of varistors. With all of the varistors groups in circuit, any increase in the variable motor load causes the motor speed to decrease. This permits the secondary voltage to increase to cause the resistance of the varistors to decrease. As a result, the secondary current increases to develop more motor torque whereby to increase the motor speed toward the former value.

To accelerate the motor, contactors A, B, C and D are energized consecutively. Contacts A1, A2 and A3 shunt varistors 42a, 44a and 46a in the respective secondary phases. Then, contacts B1, B2 and B3 shunt varistors 42b, 44b and 46b in the respective secondary phases. At each of these speed steps, the remaining varistors in circuit function in response to change in secondary voltage to regulate the motor speed. Thereafter, contacts C1, C2 and C3 shunt varistors 42c, 44c and 46c and contacts D1 and D2 shunt the three rectifier bridges to short circuit the secondary winding.

While three varistor elements have been shown in each phase of the delta connection to illustrate the invention, it will be apparent that any desired number of such elements or subgroups thereof may be connected in each group, the total number thereof employed for a particular motor being dependent upon the value of secondary voltage. Diodes 14a–d, 16a–d and 18a–d in the rectifier bridges are preferably of the silicon type to rectify the secondary voltage and to apply full 360 electrical degree conduction across each group of varistors. Alternatively, selenium rectifiers, that is, varistor devices of the solid element selenium type, could be employed in place of the silicon rectifier diodes to afford speed regulation at the high speed when contactors A, B and C are energized and contactor D is deenergized. However, use of silicon diodes in the rectifier bridges is preferred when a smaller final speed step is desired, because silicon diodes may have as little as 20 percent of the forward voltage drop of equivalent selenium rectifiers.

The modification shown in FIG. 3 is similar to the system of FIG. 1 except that the rectifier bridges are connected in star arrangement whereas in FIG. 1 such bridges are connected in delta arrangement. In FIG. 3, like parts are given reference characters like those in FIG. 1.

To provide the star arrangement of the rectifier bridges in FIG. 3, conductors 8, 10 and 12 are connected to first input terminals 20, 22a and 26 of rectifier bridges 14, 16 and 18, respectively. The second input terminals 22b, 24 and 28 of the respective rectifier bridges are connected to one another at a common point 70. In this manner, the three phases of the motor secondary winding are connected through the respective rectifier bridges to common point 70 to form a star arrangement.

When the operating coil of main power contactor M is energized in FIG. 3, contacts M1, M2 and M3 close to connect power to primary winding 4 of motor 2 to start the motor. Current flows from the secondary winding through conductor 8, diode 14a, varistors 42c, 42b and 42a and diode 14d to common point 70 and then through diode 16b, varistors 44c, 44b and 44a and diode 16c to conductor 10 and through diode 18b, varistors 46c, 46b and 46a and diode 18c to conductor 12. Current also flows from conductor 10 through diode 16a, varistors 44c, 44b and 44a and diode 16d to common point 70 and then through diode 18b, varistors 46c, 46b and 46a and diode 18c to conductor 12 and through diode 14b, varistors 42c, 42b and 42a and diode 14c to conductor 8. Current further flows from conductor 12 through diode 18a, varistors 46c, 46b and 46a and diode 18d to common point 70 and then through diode 14b, varistors 42c, 42b and 42a and diode 14c to conductor 8 and through diode 16b, varistors 44c, 44b and 44a and diode 16c to conductor 10. Current flows in each of the aforementioned circuits for a full 180 electrical degree period, these periods being in repetitive, overlapping sequential relation according to the three phases of the secondary voltage and the connection of the rectifier bridges to the secondary winding. Thus, full half-cycles of the rectified secondary voltage are applied to each of the series-connection groups of varistors. These varistors regulate the motor speed under varying load as hereinbefore described.

To accelerate the motor, the operating coil of contactor A is energized to close contacts A1, A2 and A3 and shunt varistors 42a, 44a and 46a or corresponding subgroups thereof effectively from the circuit. To accelerate the motor further, contactor B and then contactor C is energized to shunt varistors 42b, 44b and 46b and 42c, 44c, 46c, respectively, from the circuit. As a final speed step, contactor D is energized to short circuit the motor secondary winding. At those speed steps wherein varistors are in circuit, speed regulation is afforded if the motor load varies. It will be apparent that any desired number of speed steps may be employed by connecting additional varistors or subgroups thereof and contactors in a similar manner. As hereinbefore described, unidirectional varistors may be employed also in place of the rectifying diodes 14a–d, 16a–d, 18a–d in the four branches of each rectifier bridge.

Essential features of the invention reside in the use of varistors in combination with rectifier bridges in the secondary phases in place of the conventional linear resistors. In this manner, the rectifier bridges prevent application of reverse voltages on the varistor elements and thereby minimize increase in their forward resistance over a period of time. More important, however, is the fact that the use of three single phase bridge rectifiers permits good sine wave current to flow in the motor secondary windings. This results in sine wave currents to flow in the motor primary windings and also the power supply lines. From the power company point of view, this affords a more desirable load on the power line than it would if a three-phase full wave rectifier and varistors were employed. It will be apparent that in the latter case, the current wave form applied in the secondary motor windings as well as the motor primary windings and the power supply lines will have a distorted or modified shape which differs from the sine wave according to the invention. Another advantage is that a given motor torque is obtained at less power cost than if a single three-phase bridge and varistors were used in the motor secondary circuits. The delta arangement of FIG. 1 and the star arangement of FIG. 3 have certain advantages over one another for specific uses. For example, for a given motor secondary voltage, the delta arrangement affords a larger value of voltage across the varistor elements and less current therethrough than in the star arrangement whereas the latter affords a smaller value of voltage across the varistor elements and more current therethrough than the delta arrangement. However, in both arrangements the voltages across each varistor element and the currents flowing therethrough are upon the number of varistor elements connected in series in each phase and upon the value of secondary voltage.

While the systems hereinbefore described are effectively adapted to fulfill the objects stated, it is to be understood that we do not intend to confine our invention to the particular preferred embodiments of induction motor control and speed regulating systems disclosed, inasmuch as they are susceptible of various modifications without departing from the scope of the appended claims.

We claim:

1. In a motor control system, an alternating current induction motor of the slip-ring type having a primary winding and a secondary winding, a plurality of varistor means, a plurality of rectifier means connecting the respective varistor means to said secondary winding for conducting portions of the rectified secondary current therethrough, said varistor means each having a predetermined value of resistance for a given secondary voltage to regulate the speed of the motor to drive a load subject to variation, and said varistor means having a significant negative voltage-coefficient of resistance for regulating the motor speed under varying load.

2. The invention defined in claim 1, wherein each said varistor means comprises a group of solid element semiconductor devices connected in series, and means for shunting a predetermined number of said devices from each group thereof to select the speed level of the motor, said devices having a non-linear voltage-current characteristic such that the resistance thereof is high at low voltage and low at high voltage.

3. The invention defined in claim 2, wherein said semiconductor devices of each group are connected in series and parallel.

4. The invention defined in claim 1, wherein said plurality of rectifier means comprises a plurality of single phase full-wave rectifier bridges having input terminals connected to said secondary and having output terminals, and said plurality of varistor means comprises a plurality of serially-connected groups of varistor elements connected across said output terminals of said rectifier bridges respectively.

5. The invention defined in claim 4, wherein each said varistor device comprises a unidirectional conducting semiconductor diode poled to conduct current in its forward direction, and said rectifier bridges preventing application of a reverse voltage on said semi-conductor diodes.

6. The invention defined in claim 5, wherein said rectifier bridges comprise unidirectional current conducting silicon diodes in the branches thereof.

7. The invention defined in claim 5, wherein said rectifier bridges comprise unidirectional current conducting selenium varistor elements in the branches thereof.

8. In a control system for an alternating current induction motor of the slip-ring type having a stator winding energizable from a power supply source and a rotor winding, a network connected to the rotor winding for regulating the speed of the motor, said network comprising a plurality of groups of serially-connected varistor elements, and a plurality of single phase full-wave rectifier bridges connecting the respective groups of varistor elements to the rotor winding for respectively conducting full 360 electrical degrees of secondary current therethrough in their forward direction, and said varistor elements having a negative voltage coefficient of resistance to control the motor torque and thereby to regulate the motor speed under varying load.

9. In a motor control system, an alternating current induction motor of the wound rotor slip-ring type having a plural-phase primary winding energizable from a plural-phase power supply source and a plural-phase secondary winding, a plurality of groups of serially-connected varistor devices there being one such group for each phase of the secondary winding, a plurality of single-phase full-wave rectifier bridges connecting the respective groups of varistor devices to the respective phases of the secondary winding for conducting the rectified sine wave secondary current through said groups of varistor devices, and said varistor devices having a negative voltage-coefficient of resistance to maintain the motor speed substantially constant under varying load.

10. The invention defined in claim 9, wherein said rectifier bridges are connected to said secondary winding in delta arrangement.

11. The invention defined in claim 9, wherein said rectifier bridges are connected to said secondary winding in star arrangement.

12. The invention defined in claim 9, together with electroresponsive means for shunting a predetermined number of varistor devices from each said group thereof to adjust the speed of the motor.

No references cited.